Feb. 5, 1929.

F. W. GAY 1,700,840

HEAT TRANSFER MEANS FOR CLOSED ROTATING ELECTRICAL MACHINERY

Filed May 7, 1928  2 Sheets-Sheet 1

INVENTOR
Frazer W. Gay.
BY
George D. Richards
ATTORNEY

Feb. 5, 1929.

F. W. GAY 1,700,840

HEAT TRANSFER MEANS FOR CLOSED ROTATING ELECTRICAL MACHINERY

Filed May 7, 1928  2 Sheets-Sheet 2

INVENTOR
Frazer W. Gay,
BY
George D. Richards
ATTORNEY

Patented Feb. 5, 1929.

1,700,840

UNITED STATES PATENT OFFICE.

FRAZER W. GAY, OF NEWARK, NEW JERSEY.

HEAT-TRANSFER MEANS FOR CLOSED ROTATING ELECTRICAL MACHINERY.

Application filed May 7, 1928. Serial No. 275,844.

This invention relates, generally, to improvements in means for cooling electrical apparatus, especially electrical machinery such as motors and generators; and the invention has reference, more particularly, to cooling or heat transfer means in combination with the rotors and stators and other parts of apparatus having rotating parts. The invention relates further to completely enclosed machinery of the kind described with cooling or heat transfer means arranged therewith to transfer heat produced in the machine to points outside where it is dissipated to the ambient atmosphere.

This invention has for its principal object to provide a novel arrangement and construction of heat transfer means in combination with the rotating member of electrical apparatus, as e. g. the rotor of a generator; said heat transfer means comprising a plurality of hermetically sealed tubes partially filled with a volatile liquid refrigerant, said tubes having parts arranged and located so as to be exposed to heat generated within the rotating device and other parts arranged and located to dissipate heat to the outside air, whereby the refrigerant contained in said tubes is cooled and condensed and returns to carry further heat in the manner hereinafter fully set forth.

The invention has for a further object to provide means for circulating a gas, such e. g. as air, about external portions of the tubes to dissipate the heat of the hot vapors of the refrigerant and furthermore to also circulate a gas such as air between hot parts of the rotating member and the internal portions of the tubes to transfer heat from the hot parts of the former to the tubes and their contained refrigerant.

Various other objects and advantages of the invention will be obvious from the following particular description of forms of apparatus embodying the invention or from an inspection of the accompanying drawings; and the invention also consists in certain new and useful features of construction and combinations of parts hereinafter set forth and claimed.

In the accompanying drawings there are shown for purposes of illustration one form of apparatus with certain modifications thereof embodying the invention, in which.

In all of the above described figures of the drawing corresponding characters of reference indicate corresponding parts throughout.

Figure 1:
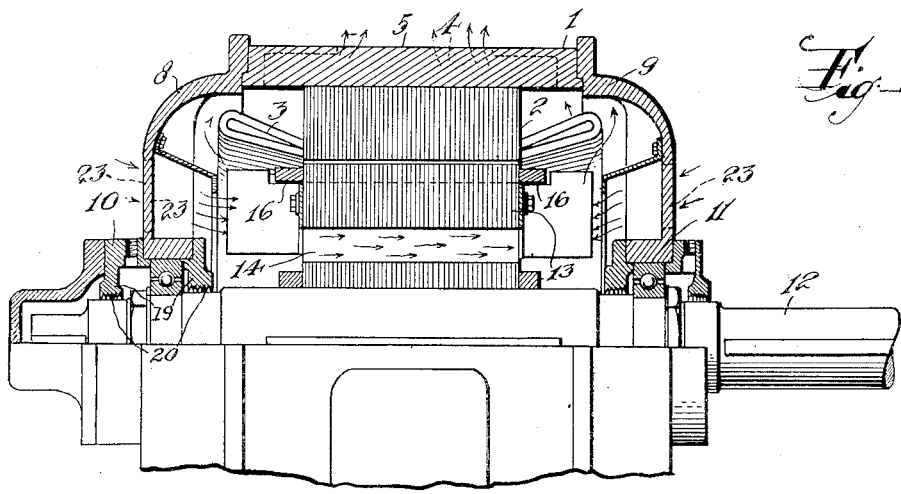
Figure 1 is an elevation view in part and in part section of a motor adapted to have embodied therewith cooling means of the invention.

Referring now to the drawings, the reference character 1 indicates a standard form housing frame which carries a magnetic stator 2 which latter in turn supports in slots therein the winding coils 3, 3. Said frame 1 has at intervals about its periphery the ventilating spaces or openings 4, 4 between the transverse ribs 5, 5 of the frame. Said spaces 4, 4 are closed by the cover plates 6, 6 attached to said frame and its ribs 5 whereby is defined transverse passages 7, 7 between said magnetic frame 2 and said cover plates 6 from one side to the other. Said housing frame 1 at its sides carries the end shields 8 and 9 which have respective ball bearings 10 and 11 between which is supported the shaft 12 carrying the rotor 13.

Said rotor 13 has formed therethrough near said shaft 12 a plurality of transverse air passages 14, 14 and in transverse peripheral slots it carries conductor bars 15 connected at each end by the end rings 16, 16. Between the ends of said passages 14, 14 and said end rings 16, 16 said rotor 13 carries the fans 17, 17 and 18, 18, said fans 17, 17 being bent to push the air into said passages 14, 14 and fans 18, 18 being bent to draw the air out therefrom, when said rotor 13 is turning in a given direction. At each end, said shields 8 and 9 carry flanges 19, 19 which extend into close proximity to said shaft 12 and, at the annular faces adjacent said shaft 12, have annular grooves 20, 20 for holding grease for closing the space between the flanges 19, 19 and the shaft 12 in a manner well known in the art. Openings 21, 21 having removable closing plugs 22, 22 are provided in said flanges 19, 19 for supplying grease from time to time to said ball bearings 10, 11 and for replenishing the grease between the flanges and the shaft.

Closing in the spaces 23, 23 between the arms of said shields 8 and 9 are air tight cover plates 24, 24 which carry in sealed relation the sealed tubes 25, 25 which extend therethrough each with one end outside the motor casing and the other end inside the same. Each of said tubes 25, 25 carries within it a body 26 of a volatile liquid such as alcohol, carbon tetrachloride or the like, a vaporization and condensation space being left in each of the tubes. Said tubes 25, 25 are arranged in annular rows, and mounted thereon on the outside are the heat conductive vanes in the form of annular segments 27, 27 which are fixed thereto in good thermal contact as by brazing, soldering, welding or the like. Likewise, within said motor said tubes have mounted thereon in thermal contact the vane segments 28, 28.

On the arms of said shields 8 and 9, between the said tubes 25, 25 adjacent thereto, are provided baffles 29 within and baffles 30 without to prevent passage of air at the arms on which said tubes are not provided.

On said shaft 12, at each end of the motor, is mounted a fan 31 whose blades 32, 32 are bent to draw air in and force it toward said vanes 27, 27 and 28, 28, flanged annular rings 33, 33 being set around the outside corners of the fan blades 32, 32 to define an air passageway into the space between said blades 32, 32.

Figure 2:
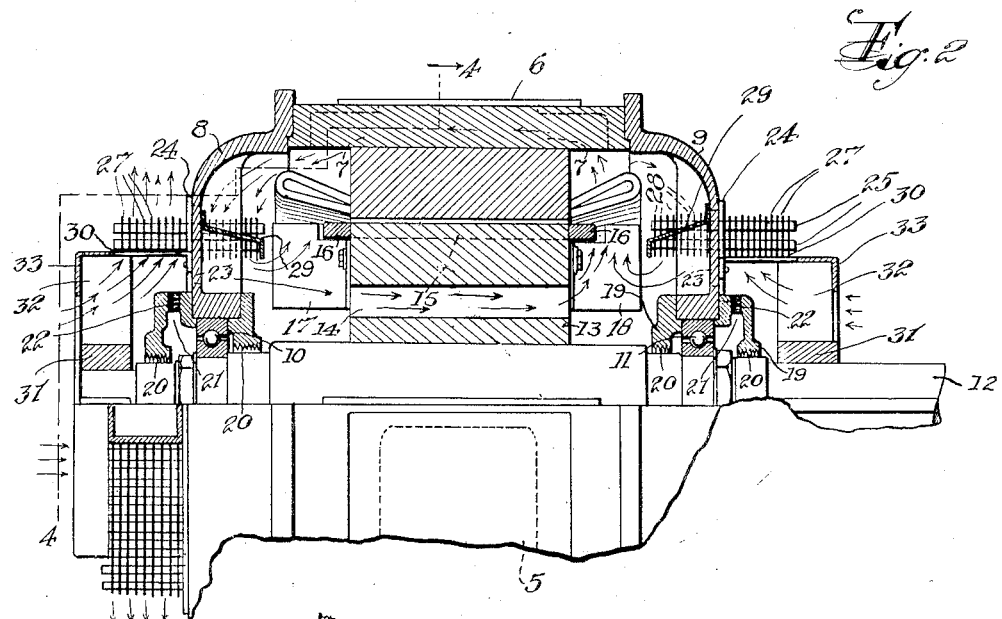
Figure 2 is a view similar to that of Figure 1 with the cooling means applied.
Figure 3:
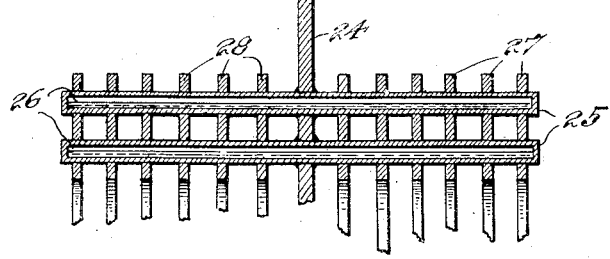
Figure 3 is a sectional view of a part of a cover plate having cooling means of the invention adapted thereto.
Figure 4:
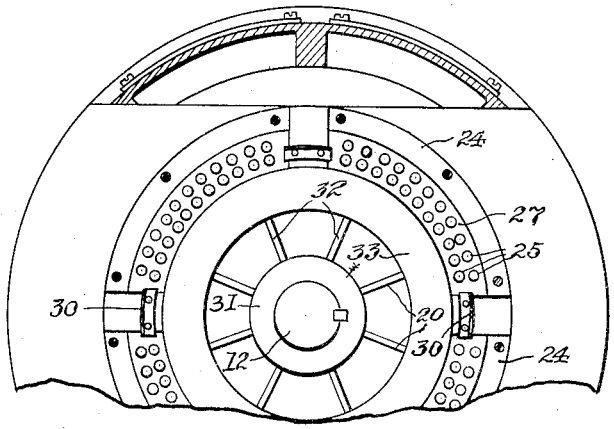
Figure 4 is a view taken along the line 4—4 of Figure 2, looking in the direction of the arrows.

In the use and operation of the motor (or generator) shown in Figs. 2, 3 and 4, heat generated therein will be carried by air circulated by fans 17 and 18 through passageways 7, 7 and 14, 14 and into contact with said vanes 28, 28 whereby the heat is transmitted from the air to said bodies of volatile liquid 26, 26 which at a given temperature will be vaporized. The vapor will pass to and come in contact with those parts of tubes 25, 25 which are outside the motor where they will transfer their heat to said vane rings 27, 27 and condense. From said vane rings 27, 27 the heat is carried away by currents of air forced thereagainst and thereby by said fan blades 32, 32. In this manner the interior of the motor, although completely enclosed, will be kept at a minimum temperature which, by the use of a suitable number of the tubes 25, 25 and the accompanying air circulating and heat transfer parts, can be predetermined to be well within a safe operating range.

Figure 5:
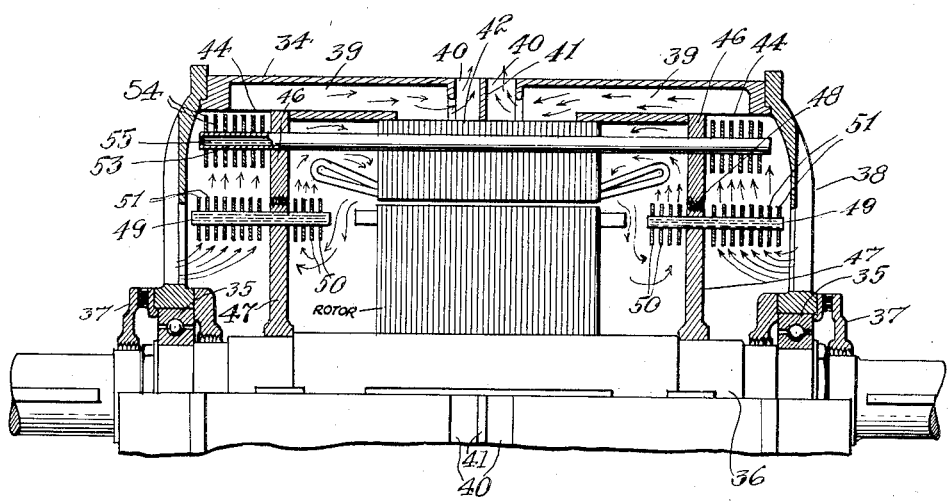
Figure 5 is a vertical section view in part of an alternate embodiment of the invention.

In Figure 5 is shown an alternate embodiment in which is an especially designed closed motor instead of the modified standard open frame motor of Figures 1 and 2, and in which the sealed heat transfer tubes are mounted to both the stator and the rotor. In this embodiment the stator frame 34 through the ball bearings 35, 35 supports the rotor shaft 36, the usual dust guard and grease holding flanges 37, 37 being carried by the end shields 38, 38 of said frame 34.

Said frame 34 is entirely closed, and has formed within it two annular passages 39, 39 which are connected to the outside through the central annular openings 40, 40, which latter are separated from each other by the annular deflecting flange 41 which extends outwardly from the stator 42 carried by frame 34 and which is narrower than said frame 34. At their outer ends said annular channels 39, 39 have annular openings 44, 44 in the under surface of said frame 34. A rotor 45 of the width as said stator 42 is carried by said shaft 36. From the inner surface of said frame 34 at the inner edge of the respective annular openings 44 there extend, one at each end, the annular flanges 46, 46 which with corresponding annular flanges 47, 47 mounted to said shaft 36 close over the ends of the stator 42 and rotor 45. Said flanges 46 and 47 have a running clearance 48 between them which is packed with grease.

Through each of said flanges 47, 47 there extends a plurality of sealed tubes 49, 49 arranged in an annular row and sealed in good thermal contact to said flanges 47, 47. Within said flanges 47, 47 said tubes 49, 49 carry in thermal contact the annular vane rings 50, 50 and outside they carry the annular vane rings 51, 51. Each of said tubes 49, 49 has within it a body of volatile liquid 52 which partly fills it and leaves a vaporization and condensation space.

Extending through said stator 42 and through said flanges 46, 46 at each end are a plurality of sealed tubes 53, 53 arranged in an annular row and carrying on their outside ends the annular vane rings 54, 54 mounted in thermal contact thereto. In each of tubes 53, 53 is a body of volatile liquid 55 partly filling the same and leaving a vaporization and condensing space.

In the use and operation of this embodiment of the invention said vanes 50, 50 transfer heat from the air within the motor to the bodies of volatile liquid 52, 52 within said tubes 49, 49 which in turn, through vaporization and condensation transmit the heat to said vanes 51, 51 from which it is taken by currents of air which pass inwardly between the arms of said end shields 38, 38 thence upwardly through the annular openings 44, 44, through annular passages 39, 39, through annular openings 40, 40 to the atmosphere. These currents of air on their way carry heat from said vanes 54, 54 which have received heat transmitted by the volatile liquid bodies 55, 55 from the interior of said stator 42. In this manner the motor is kept completely closed and yet is maintained at a minimum operative temperature.

While I have shown and described and have pointed out in the annexed claims certain novel features of the invention, it will be understood that various omissions, substitutions and changes in the form and details of the devices illustrated and in its use and operation may be made by those skilled in the art without departing from the spirit of the invention.

I claim:

1. In combination in a rotating electric machine, an air excluding casing thereabout, and sealed tubes extending through said casing in sealed relation thereto, each of said tubes having therein a body of volatile liquid and an evaporation and condensation space.

2. In combination in a rotating electric machine, an air excluding casing thereabout, sealed tubes extending through said casing in sealed relation thereto, each of said tubes having therein a body of volatile liquid and an evaporation and condensation space, and means inside said casing adapted to circulate air from the heat generating parts of the machine into thermal contact with said tubes.

3. In combination in a rotating electric machine, an air excluding casing thereabout, sealed tubes extending through said casing in sealed relation thereto, each of said tubes having therein a body of volatile liquid and an evaporation and condensation space, means inside said casing adapted to circulate air from the heat generating parts of the machine into thermal contact with said tubes, and means outside said casing adapted to circulate air into contact with said tubes.

4. In combination, an electric machine having a stator and a rotor, an air excluding casing about said rotor, sealed tubes extending through said casing in sealed relation thereto with one part within the casing and an end outside the same, each of said tubes having therein a body of volatile liquid and an evaporation and condensation space.

5. In combination, an electric machine having a stator and a rotor, an air excluding casing about said rotor, sealed tubes extending through said casing in sealed relation thereto with one part within the casing and an end outside the same, each of said tubes having therein a body of volatile liquid and an evaporation and condensation space, said rotor having transverse passageways therethrough, and means within said casing adapted to circulate air through said passageways and into thermal contact with said tubes.

6. In combination, an electric machine having a stator and a rotor, an air excluding casing about said rotor, sealed tubes extending through said casing in sealed relation thereto with one part within the casing and an end outside the same, each of said tubes having therein a body of volatile liquid and an evaporation and condensation space, said rotor having transverse passageways therethrough, and means within said casing adapted to circulate air through said passageways and into thermal contact with said tubes, and means outside said casing adapted to circulate air into thermal contact with said tubes.

7. In combination with an open frame electric machine having a stator and a rotor, air tight cover plates shutting in said frame to completely enclose the stator and rotor in air tight relation, and sealed tubes extending through certain of said plates in air tight relation, each of said tubes having therein a body of volatile liquid and an evaporation and condensation space thereover.

8. In combination with an open frame electric machine having a stator and rotor, air tight cover plates forming with said frame an enclosure completely shutting in said stator and rotor in air tight relation and defining with said stator transverse channels from one side of the machine to the other within the enclosure, sealed tubes extending in sealed relation through said enclosure and each having within it a body of volatile liquid and an evaporation and condensation space, and means in said enclosure adapted to circulate air through said channels and into thermal contact with said tubes.

9. In combination with an open frame electric machine having a stator and a rotor, air tight cover plates forming with said frame an enclosure completely shutting in said stator and rotor in air tight relation and defining with said stator transverse channels from one side of the machine to the other within the enclosure, said rotor having transverse passageways therethrough, sealed tubes extending in sealed relation through said enclosure and each having within it a body of volatile liquid and an evaporation and condensation space, and means in said enclosure adapted to circulate air through said channels and passageways and into thermal contact with said tubes.

10. As a subcombination, cover plates for electric machines, said plates having extending therethrough sealed tubes containing volatile liquid partly filling the same.

11. In combination with an open frame electric machine having a stator and rotor, air tight cover plates forming with said frame an enclosure completely shutting in said stator and rotor in air tight relation, said plates having extending therethrough sealed tubes containing volatile liquid partly filling the same, means inside said casing adapted to circulate air from the heat generating parts of the machine into thermal contact with said tubes, and means outside said casing adapted to circulate air into contact with said tubes.

In testimony that I claim the invention set forth above I have hereunto set my hand this 25th day of April, 1928.

FRAZER W. GAY.